Oct. 1, 1935.                G. A. LYON                2,015,944
                 COVER FOR SPARE TIRES OF AUTOMOBILES
                   Filed Dec. 28, 1928          2 Sheets-Sheet 1
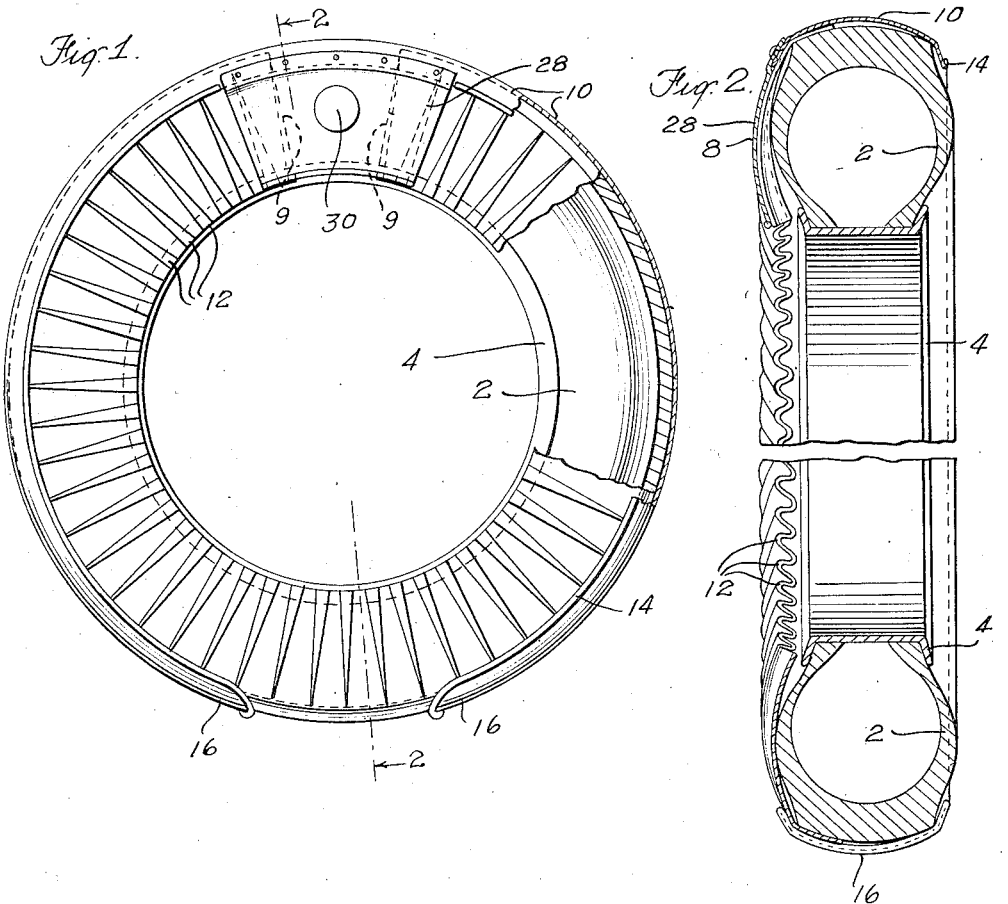
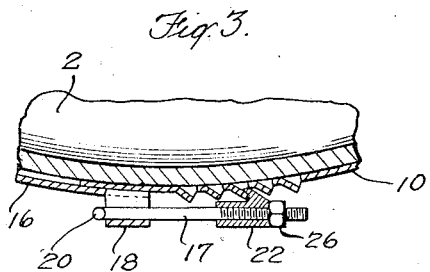
INVENTOR
GEORGE ALBERT LYON Oct. 1, 1935.  G. A. LYON  2,015,944
COVER FOR SPARE TIRES OF AUTOMOBILES
Filed Dec. 28, 1928  2 Sheets-Sheet 2
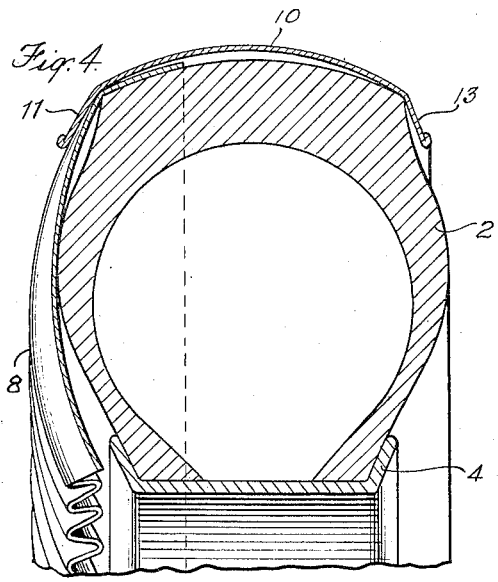
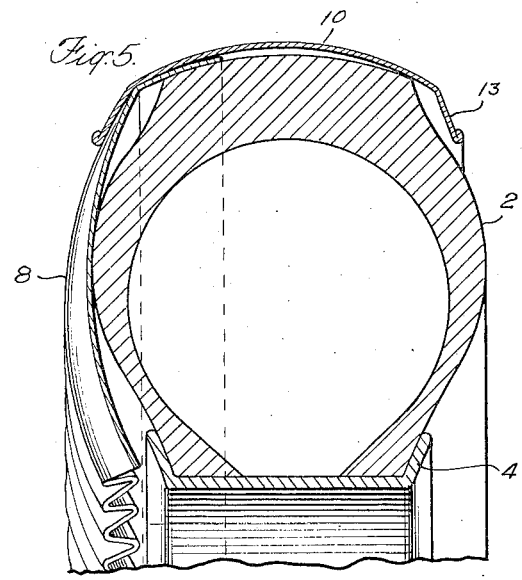
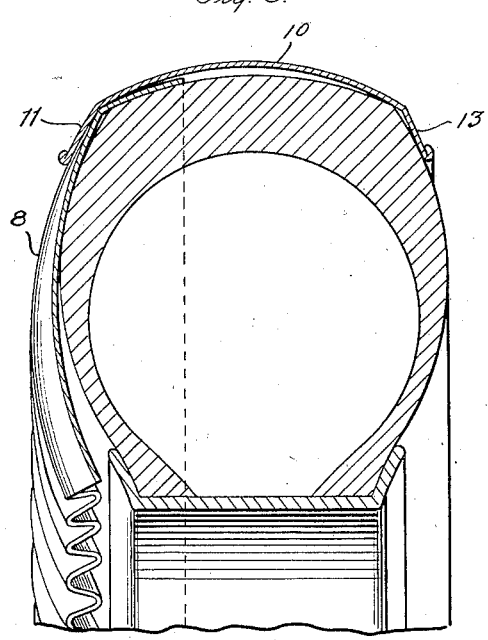
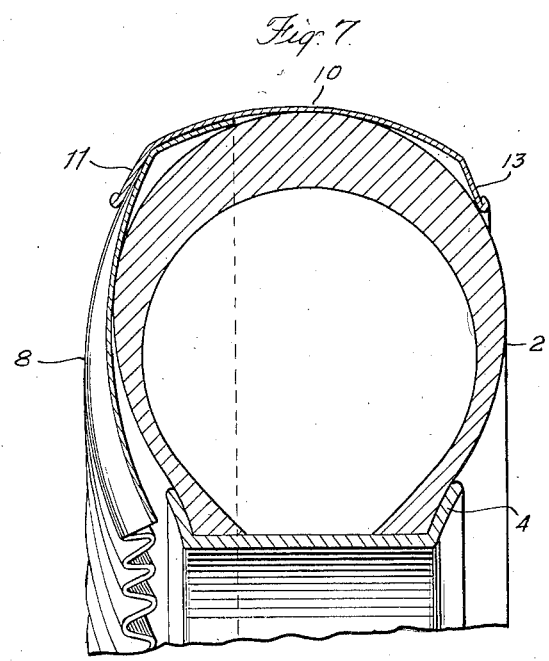
INVENTOR
GEORGE ALBERT LYON
BY
ATTORNEYS Patented Oct. 1, 1935

2,015,944

UNITED STATES PATENT OFFICE 2,015,944

COVER FOR SPARE TIRES OF AUTOMOBILES

George Albert Lyon, Allenhurst, N. J., assignor to Lyon Incorporated, Asbury Park, N. J., a corporation of Delaware Application December 28, 1928, Serial No. 328,895

14 Claims. (Cl. 150—54)

This invention relates to covers for spare tires carried upon automobiles.

The usual spare tire cover consists of a canvas casing coated with waterproofing material and formed to fit the contour of the spare tire and carrier. These tire covers are unattractive in appearance and are subject to shrinkage so that they are difficult to apply to a tire after having been in use for a relatively short time. Such casings often cannot be applied to a tire so that they will fit the tire smoothly. They also wear out quickly and are readily torn, particularly when struck by another car, as often happens in congested traffic conditions. Such covers do not constitute a satisfactory protection for the tire against damage in case of collision. The ordinary tire cover, since it is made of highly flexible material, not only wrinkles readily, but when applied to a tire, conforms to the projections and depressions on a tire so that it does not present a smooth outer surface.

The principal objects of the present invention are to improve the construction and mode of operation of spare tire covers and to produce a cover which will present a highly attractive appearance, which will furnish a satisfactory protection for the tire and which may be readily applied to and removed from the tire.

With these and other objects in view, the invention comprises the novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings—

Fig. 1 is a view in front elevation of a spare tire with a tire cover embodying the invention applied thereto;

Fig. 2 is a sectional view on an enlarged scale of the tire and cover taken substantially on the line 2—2 of Fig. 1;

Fig. 3 is a detail sectional view taken substantially on the central plane of the tire and illustrating a construction which may be employed in a modified form of the cover; and Figs. 4, 5, 6 and 7 are sectional views taken transversely through the tire cover, tire and rim and illustrating the manner in which the cover fits tires of different cross sections.

In the construction shown in the drawings, the tire cover is illustrated as applied to a tire indicated at 2 mounted on a rim 4. The tire cover comprises a ring member or section 8 arranged to cover the side of the tire and a ring member or section 10 arranged to extend about the periphery of the tire. Both of these members are constructed of relatively stiff resilient sheet material and are preferably made of sheet metal.

The section 8 has a concave form in cross section on the side thereof which is adjacent the tire and is arranged to overlap the tread portion of the tire at its outer margin and to extend inwardly from the tread portion toward the axis of the tire over the surface of the tire which occupies the outer position when the tire is carried upon an automobile. This section preferably engages the tire at the tread and also at the high point in the convex side of the tire, as clearly shown in Fig. 2.

The section 8 is preferably made in the form of a divided ring with the end portions of the ring indicated at 9 in Fig. 1, separated by a space when the ring is in position on the tire. This section is also preferably made somewhat smaller than the tire to which it is to be applied and is expanded in applying the section to the tire.

The section 8 of the cover may be made of a straight strip of sheet metal by forming the strip with transverse tapered corrugations 12, these corrugations diminishing in width from the inner to the outer portion of the section. This formation of the section gives the section a great deal of flexibility and enables the section readily to be expanded and to contract respectively in removing the tire cover from and in securing the same upon a tire. A straight or curved strip of sheet metal may be readily formed into a ring of the shape of the section 8 by passing the strip between suitably shaped rolls.

The section 10 of the cover, which is arranged to fit about the periphery of the tire, is concave upon the inside thereof, this section fitting over the periphery or tread portion of the tire and overlapping the section 8 preferably on the outside thereof in the manner shown in Fig. 2. As shown in this figure, the section 10 extends transversely across the tread portion of the tire and projects some distance beyond this tread portion on each side thereof, the tread portion of the tire extending into the concavity in the section. The cross-sectional curvature of the section 10 is preferably greater than the curvature of the tread portion of the tire, as shown in Figs. 4, 5 and 6. With this formation of the section 10, this section and the outer marginal portion of section 8 will engage the tread portion of the tire adjacent the sides thereof where the wear is least, the greatest wear occurring upon the central part of the tread. The section 10 is provided with inwardly extending marginal flanges 11 and 13 arranged at oblique angles to the central plane of the tire to embrace the peripheral portion of the tire and the outer portion of section 8, as is clearly shown in Figs. 2 and 4 to 7 inclusive. The section 10 is preferably formed with folded edge portions 14 turned back upon the body of the section to form finished rounded edges.

The section 10 is also made in the form of a divided ring, as is clearly shown in Figs. 1 and 3, and is of a size somewhat smaller than required to fit the periphery of the tire to which it is applied. The section is expanded in applying the same to the tire, the resiliency of the material allowing the section readily to expand. The formation of the ring section shown in Figs. 1 and 2 is such that the end portions of the section indicated at 16 are separated by a space when the section is applied to a tire, as shown in Fig. 1 and the end portions are preferably rounded, as shown in this figure. The section 10 of the cover may also be formed into the general shape shown in the drawings, from a straight strip of sheet metal by passing the strip between suitably shaped rolls.

The sections 8 and 10 of the cover are preferably shaped into the general form shown in the drawings by cold rolling operations. The cold rolling operation will give the sections the required degree of resiliency to cause them to contract upon the tire after their expansion in the applying operation.

With this construction the section 10 will overlap the outer marginal portion of the section 8 for some distance when the two sections are applied to a tire. As above stated, both of the sections 8 and 10 are made somewhat smaller than required to fit the tire to which they are to be applied and the two sections are contracted upon the tire in securing the cover on the tire by the resiliency of the sheet material. Both sections are secured in position on the tire by the contraction of the section 10, the section 8 being thereby held in position on the tire because of its overlapping engagement with the section 10.

In applying the two sections to the tire, preferably the section 8 is applied in position with the end portions 9 located at the upper portion of the tire, and the section 10 is applied with the end portion 16 located at the lower portion of the tire, as shown in Fig. 1. In order to cover the side of the tire between the ends of the section 8, a plate 28 is secured to the section 10 and extends therefrom inwardly over the side of the tire, this plate overlapping the end portions of the section 8, as clearly shown in Fig. 1. This plate is provided with a bordered area 30 on which may be applied the initials of the owner of the car.

In applying the tire cover above described to a tire, the tire and rim are preferably placed in a horizontal position upon the ground or upon any other suitable support. The section 8 is first laid upon the upper side of the tire and is then expanded and placed over the tire with the body of the section engaging the high point in the convex part of the side of the tire and with its margin overlapping the tread of the tire, as shown particularly in Fig. 2. Upon release of this section after its expansion, the contraction of the section produced by the resiliency of the material, will cause the marginal portion to engage forcibly the tread surface of the tire. The section 10 is then expanded and passed over the periphery of the tire and positioned with its outer margin overlapping the section 8 and with its marginal flanges 11 and 13 extending inwardly respectively over the outer face of the section 8 and over the inner face of the tire. Upon the release of the section 10, after its expansion, said section will contract by reason of the resiliency of the material and securely grip the tread portion of the tire. This contraction of the section 10 will secure both sections in position upon the tire.

In removing the tire cover from the tire, the section 10 is expanded until it will pass over the periphery of the tire and the section 8 is then expanded and removed laterally from the tire. Thus the two sections of the cover may be very readily applied to and removed from the tire.

In certain cases it may be desirable to apply to the section 10 a greater contracting force than that given by the resiliency of the material of said section in order to hold the cover more securely on the tire. In such cases the section 10 may be provided with devices for relatively moving the end portions 16 of the section in a direction to contract the section. Fig. 3 of the drawings shows such devices. As shown in this figure, the end portions of the section 10 are arranged to overlap and slide relatively during the expansion and contraction of the section. The construction shown in this figure comprises a bolt 17 passing through a loop 18 struck up from the metal of one end portion 16 of the section. This bolt is provided with a T-shaped head 20 engaging one end of the loop. The bolt 17 carries a sleeve 22 slidably mounted thereon and provided with a hook which is arranged to engage any one of a series of projections 24 formed on the other end portion 16 of the section 10. These projections are also preferably formed by striking up the metal of the section 10. A nut 26 is threaded on the bolt 17 outside of the sleeve 22 to actuate the sleeve. Thus the section 10, after being contracted upon the periphery of the tire by the resiliency of the material, may be still further contracted to secure the cover more firmly on the tire by engaging the hook on the sleeve 22 with one of the projections 24 and turning the nut 26 to advance the same toward the head end of the bolt. In removing the section 10 from the tire, the nut 26 is turned in the opposite direction on the bolt and the hook on the sleeve 22 is released from the projection 24 which it engaged. This releases the end portions of the section 10 so that the section may be readily expanded.

The present tire cover is especially formed to fit different shapes of tires. Figures 4 to 7 inclusive show the manner in which the cover will accommodate itself to tires of different shapes. As above stated, the section 10 of the cover is provided with a body portion, concave in cross-section and with flanges 11 and 13 extending inwardly from the body of the section toward the axis of the cover. The flanges 11 and 13 are inclined obliquely to the central plane of the tire, these flanges extending outwardly from said plane. The inclination of the flanges 11 and 13 may be varied to suit the requirements for fitting tires of different cross sections. The flange 11 as is shown in the drawings, has a slightly greater inclination to the central plane of the tire than the flange 13. The section 10 is preferably made of sufficient width so that the flanges 11 and 13 will embrace the tread portions of various shapes of tires between certain tire size ranges.

Figs. 4 and 5 show the cover applied to a tire in which the tread portion of the tire has the general form of a truncated wedge in cross-section. The tread portion of the tire shown in Fig. 4, however, is considerably wider than that shown in Fig. 5. The tread portion of the tire shown in Fig. 4 fits fairly closely between the side flange 13 and the marginal portion of section 8. When the cover is fitted to a tire of the cross section shown in Fig. 5, a considerable space is left between the tread portion of the tire and the flange 13 on one side of the tire and between the tread portion of the tire and the marginal portion of the section 8 on the other side of the tire. The tire shown in Fig. 6 has a tread portion of substantially the same width as that shown in Fig. 4. The convex outer surface of the side wall in this form, however, begins at the juncture of the side wall with the tread portion. A tire cover having the form described will readily fit a tire of this cross-sectional shape, as shown in this figure.

Figure 7 shows the tire cover fitted to a tire, the tread portion of which is substantially cylindrical. The tire cover may be readily fitted to a tire of this formation, the section 10 contacting with the central part of the tread portion of the tire and the flanges 11 and 13 and extending inwardly upon each side of the cylindrical tread portion as shown in this figure.

The tire cover above described presents a very attractive appearance and funishes a reliable, satisfactory protection for the tire. The corrugations 12 in the section 8 radiating from the axis of the tire, greatly enhance the attractiveness of the appearance of the cover, particularly when the outer surface of the section 8 has a high polish. The two sections of the tire cover may be applied to and removed from the tire by simple, easy and convenient manual operations and will be held securely on the tire by the contraction of the section 10. The cover also has the advantage that the principal parts thereof may be rapidly and cheaply manufactured by machine operations.

The tire cover occupies very little space at the side or about the periphery of the tire so that the tire with the cover applied thereto will fit in a socket or well in the running board, with which many cars are at present provided. When the tire with the cover applied is placed in the socket, the cover cannot be removed from the tire without first removing the tire from the socket. Thus the locking of the tire in the well also locks the cover in position.

It is to be understood that the invention is not limited to the particular construction and arrangement of parts of the illustrated embodiment of the invention, but that the invention may be embodied in other forms within the scope of the claims.

Having explained the nature and object of the invention, and having specifically described a construction embodying the invention in its preferred form, what is claimed is:

1. A cover for the spare tires of automobiles comprising an annular radially expansible and contractible section made of relatively stiff material for covering one side of a tire, and an annular section formed to extend transversely across the tread and peripherally partially about the tire to cover the tread and constructed to be radially expanded and contracted independently of said side section and to grip the tire and hold itself and the side section in place on the tire by its contraction.

2. A cover for the spare tires of automobiles comprising an annular radially expansible and contractible section made of relatively stiff material for covering one side of a tire, and an annular section formed to extend transversely across the tread and peripherally partially about the tire to cover the tread and to overlap the side section on the outside thereof, said peripheral section being arranged to grip the tire and hold itself and the side section in place by its contraction.

3. A cover for the spare tires of automobiles comprising an annular radially expansible and contractible section made of relatively stiff material and formed to cover one side of a tire and to overlap the tread thereof, and an annular expansible and contractible section formed to extend transversely across the tread and peripherally partially about the tire to cover the tread and to overlap the side section on the outside thereof and arranged to grip the tire and to hold itself and the side section in place on the tire by its contraction.

4. A cover for the spare tires of automobiles comprising an annular section made of relatively stiff material for covering substantially only one side of a tire and constructed to be radially expanded and contracted in fitting the same to a tire, and an annular section formed to extend transversely across the tread and peripherally partially about the tire to cover the tread and constructed to be expanded over the tire independently of the first section and to be contracted by spring action into gripping engagement with the tire.

5. A cover for the spare tires of automobiles comprising an annular radially expansible and contractible section for covering one side of a tire having a series of transverse corrugations to render the same radially flexible, and an annular section formed to extend transversely across the tread of the tire and peripherally partially about the tire to cover the tread and constructed to be radially expanded over the tire and to be contracted into engagement with the tire independently of the first section.

6. In a tire cover a split corrugated side portion to cover the side wall of the tire and an open ended tread covering portion extending from said side portion across the tread of the tire comprising a resilient split expansible ring to be fitted over the tread of the tire and contractible upon the tire into cover holding engagement with the tire independently of said side portion, the corrugations in said portion providing it with flexibility so that it will readily accommodate itself to slight variations in size and contour of the spare tire.

7. In a multi-part tire cover, a radially expansible and contractible ring-like plate formed for disposition over only a side of the tire and having its outer peripheral edge formed to extend inwardly toward the tread of the tire for gripping the tire when the plate is contracted and for cooperation with another part of the tire cover and a split band disposed over substantially only the tire tread for holding said plate against expansion and in position on the tire.

8. As an article of manufacture, a spare tire cover comprising a resilient split arcuate ring member for disposition over the tire tread and extending about more than one-half of the outer periphery of the tire, an annular side plate structure for disposition over a side wall of the tire and retained in position on the tire by said ring member, said split ring member having a portion of a marginal edge thereof secured to the outer marginal edge of an adjoining part of said plate structure, the remainder of said rim edge being free of said side plate structure.

9. In a tire cover, a split corrugated side portion to cover the side wall of the tire and an open ended tread covering portion extending from said side portion across the tread of the tire and comprising a resilient split expansible ring to be fitted over the tread of the tire and contractible upon the tire into cover holding engagement with the tire independently of said side portion, the corrugations in said side portion extending transversely to the periphery of said portion so as to provide said portion with flexibility so that it will readily accommodate itself to slight variations in size and contour of the spare tire.

10. A cover for the spare tires of automobiles comprising an annular radially expansible and contractible section of relatively stiff material for covering one side of a tire, and a separate substantially annular open bottom flexible section of substantially continuous sheet material formed to extend transversely across the tread and contractible into holding engagement with the tire for attachment thereto independently of said side section.

11. In a spare tire cover, a side part for disposition over a side wall of the tire and having a laterally extending marginal portion for overlying a part of the tire tread, a split ring for disposition over another part of the tire tread and formed for cooperation with said marginal portion, said ring having an inwardly angularly extending marginal portion forming with the ring an interior angle approaching a right angle for overhanging the rear side of the tread, leaving the rear side wall of the tire substantially uncovered, and providing a peripheral corner recess for receiving the rear peripheral corner of the tread, and means provided to permit spreading of the ends of said ring apart and to provide for the lateral shoving of the ring over the tread of the tire and for thereafter tightening said ring about the first portion to bring the second portion into cover-retaining relation to the tire tread.

12. In a spare tire cover a side part for disposition over a side wall of the tire and having a peripheral corner affording a laterally extending marginal portion for overlying a part of the tire tread, a split ring for disposition over another part of the tire tread and formed for cooperation with said marginal portion, said ring having inwardly angularly extending marginal portions each forming with the ring an interior angle approaching a right angle affording peripheral pockets for receiving said corner and the rear corner of the tread, leaving the rear side wall of the tire substantially uncovered, and being expansible and contractible radially into retaining engagement with the front marginal portion of said side part and with the rear side of said tread.

13. A spare tire cover including an arcuate side member for disposition over an outer side of the spare tire and having a laterally extending expansible and a contractible spring part for overlying the tread of the tire to hold said member in position on the tire during application of the cover, and a tread covering member for disposition on the tread of the tire and over said lateral spring part to conceal and render said spring part inaccessible.

14. A spare tire cover including an arcuate push on side member for disposition over an outer side of the spare tire and having laterally extending resilient means projecting inwardly beyond the outer side wall of the tire for yieldably holding said member in position during application of the cover, and a tread covering member for disposition on the tread of the tire for retaining the arcuate member on the tire.

GEORGE ALBERT LYON.